United States Patent [19]

Jespersen et al.

[11] E Re. 28,911

[45] Reissued July 20, 1976

[54] DISPENSER FOR FLEXIBLE SHEET MATERIAL AND A PERFORATING MECHANISM ADAPTED TO BE USED THEREIN

[75] Inventors: Paul W. Jespersen, Stamford, Conn.; Edward L. Bump, Oak Park, Ill.

[73] Assignee: Georgia-Pacific Corporation, Portland, Oreg.

[22] Filed: Sept. 30, 1974

(Under Rule 47)

[21] Appl. No.: 510,780

Related U.S. Patent Documents

Reissue of:

[64] Patent No.: 3,739,965
Issued: June 19, 1973
Appl. No.: 104,415
Filed: Jan. 6, 1971

U.S. Applications:

[62] Division of Ser. No. 793,808, Jan. 24, 1969, Pat. No. 3,575,328.

[52] U.S. Cl. ..... 225/96; 225/106; 83/334; 83/337; 83/660; 83/678

[51] Int. Cl.[2] ..... B26F 3/02

[58] Field of Search ..... 225/2, 4, 96, 100, 101, 225/106; 83/334, 335, 660, 678, 332, 345

[56] References Cited

UNITED STATES PATENTS

| | | | |
|---|---|---|---|
| 778,006 | 12/1904 | Brooks | 83/345 |
| 1,133,640 | 3/1915 | Hamilton | 83/345 X |
| 1,449,062 | 3/1923 | Schroeder | 83/678 UX |
| 1,467,481 | 9/1923 | Juline | 83/678 X |
| 2,278,029 | 3/1942 | Walsh et al. | 83/345 |
| 3,106,859 | 10/1963 | Huffman | 83/345 |
| 3,221,586 | 12/1965 | Bahnsen | 225/8 X |

*Primary Examiner*—J. M. Meister
*Attorney, Agent, or Firm*—Schuyler, Birch, Swindler, McKie & Beckett

[57] ABSTRACT

A mechanism for perforating a web of flexible sheet material which is adapted to be used in a flexible sheet material dispenser, said mechanism comprising; a rotatably mounted roller, a rotatably mounted knife positioned adjacent the roller and having a radially outward portion defining a cutting edge for perforating the web as the web passes between the roller and the knife, the roller being operatively connected to the knife for synchronous rotation therewith and having a slot therein for receiving the radially outward knife portion as the knife rotates past the roller, and means associated with the knife for orienting the cutting edge substantially in the direction in which the radially outward knife portion moves with respect to the web during the entrance of the portion into the slot so that when the portion enters the slot the cutting edge will effectively perforate the web.

11 Claims, 23 Drawing Figures

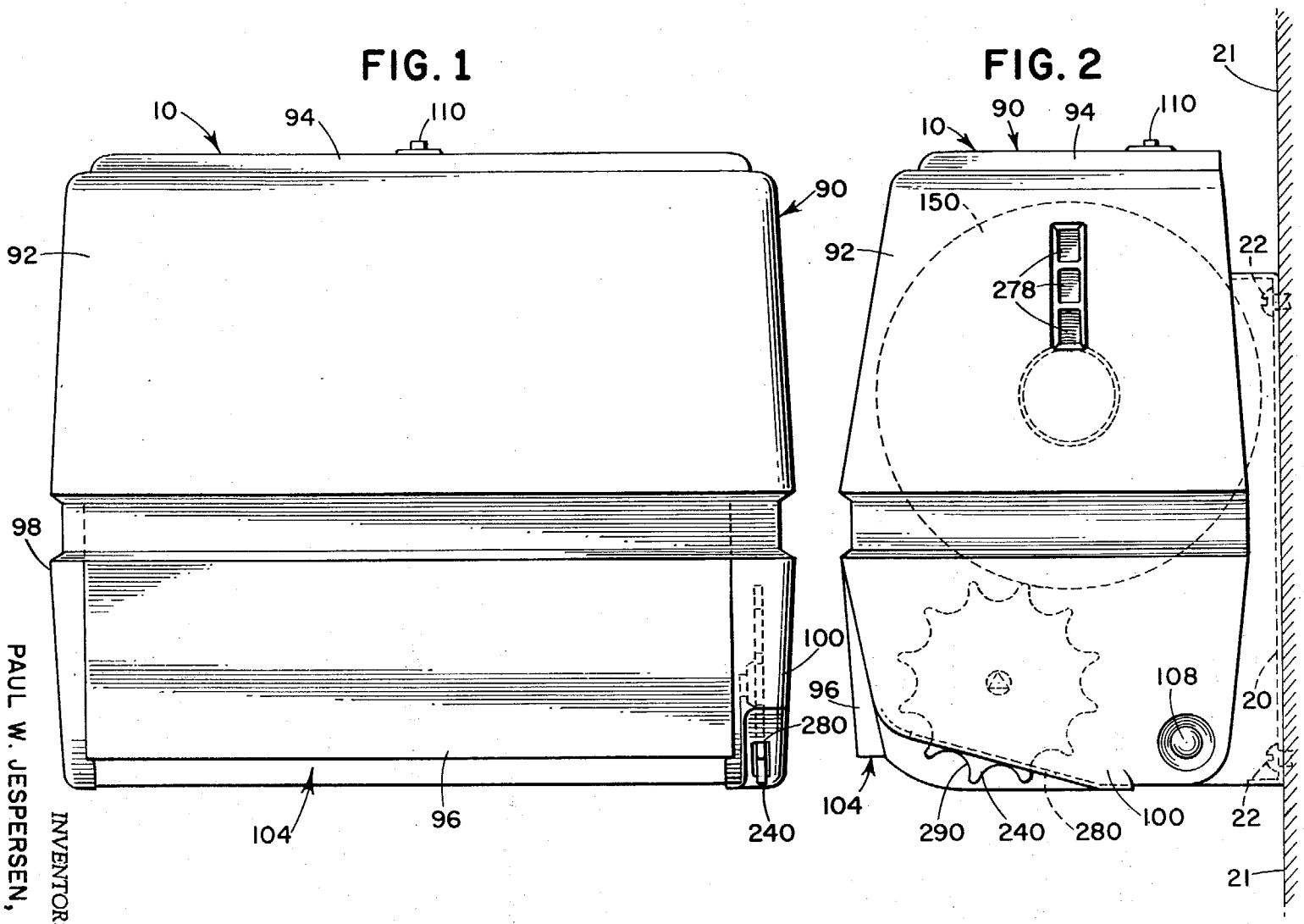
INVENTORS
PAUL W. JESPERSEN,
EDWARD L. BUMP

INVENTORS

PAUL W. JESPERSEN,
EDWARD L. BUMP

INVENTORS
PAUL W. JESPERSEN,
EDWARD L. BUMP

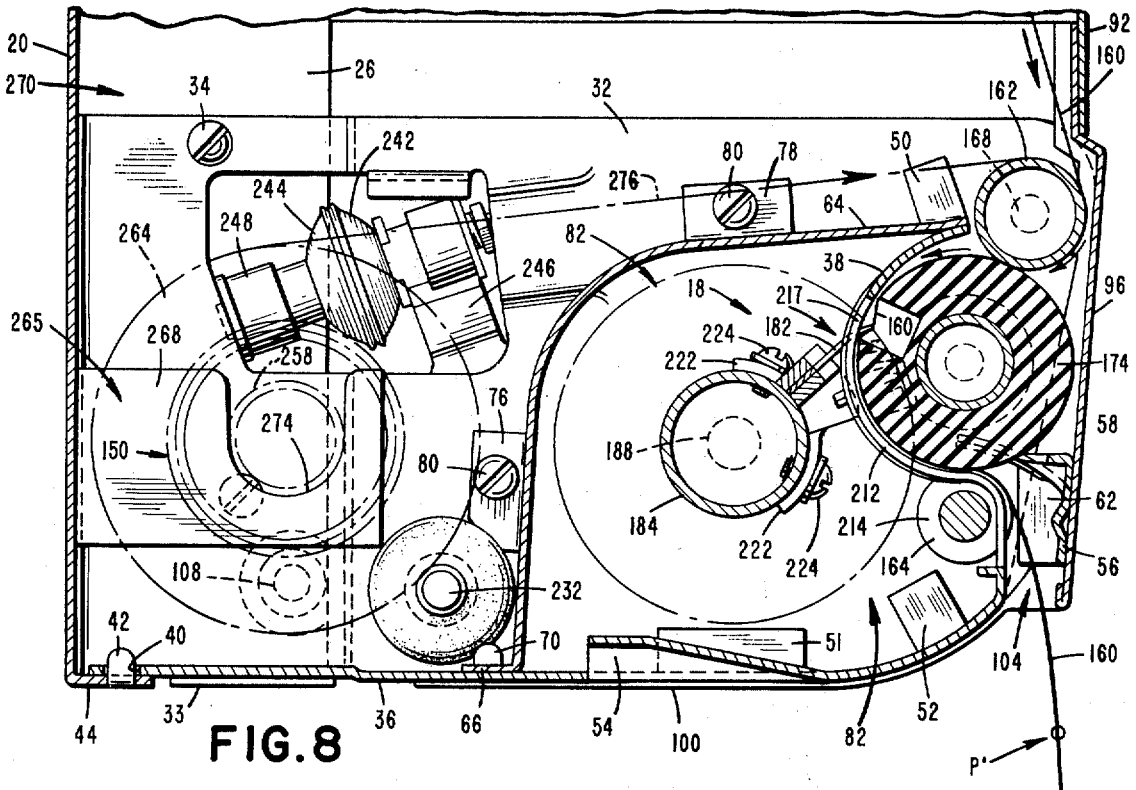
FIG.8
FIG.9
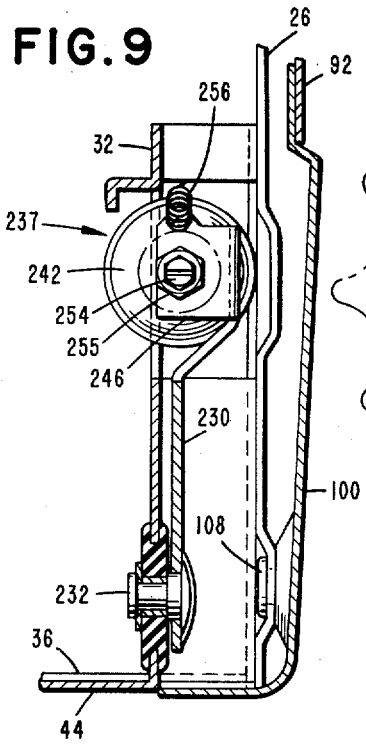
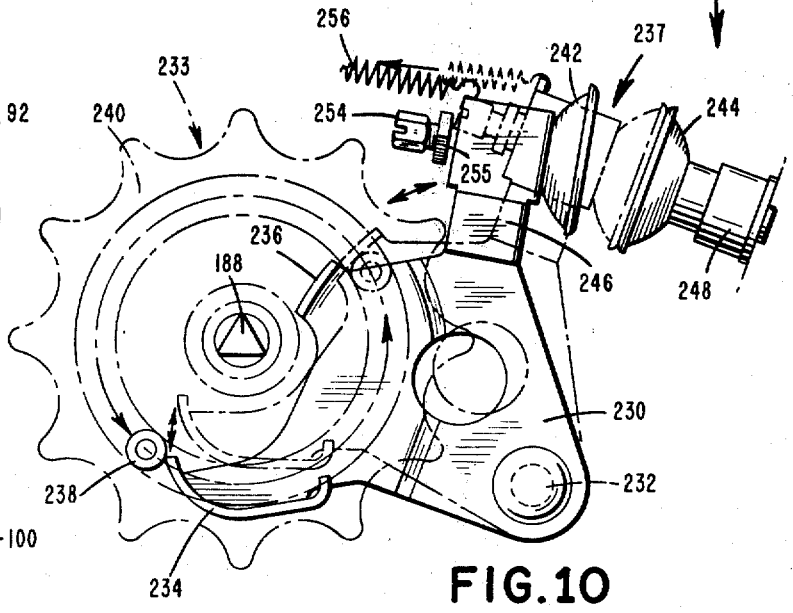
FIG.10
INVENTORS
PAUL W. JESPERSEN,
EDWARD L. BUMP

INVENTORS
PAUL W. JESPERSEN,
EDWARD L. BUMP

INVENTORS
PAUL W. JESPERSEN,
EDWARD L. BUMP

DISPENSER FOR FLEXIBLE SHEET MATERIAL AND A PERFORATING MECHANISM ADAPTED TO BE USED THEREIN

Matter enclosed in heavy brackets [ ] appears in the original patent but forms no part of this reissue specification; matter printed in italics indicates the additions made by reissue.

RELATED APPLICATION

The present application is a divisional application of application Ser. No. 793,808, filed Jan. 24, 1969, now U.S. Pat. No. 3,575,328.

BACKGROUND OF THE INVENTION

1. Field of the Invention

This invention relates to dispensers, and specifically to a flexible sheet material dispenser and a mechanism adapted to be used therein for perforating a web of flexible sheet material.

2. Description of the Prior Art

Dispensers for flexible sheet material, such as paper toweling have long been known which include mechanisms for perforating or severing a web of such material to divide the web into individual sheets. Representative of such dispensers are those disclosed in Hamilton et al. U.S. Pat. No. 1,133,640; Schroeder U.S. Pat. No. 1,449,062; Shelley U.S. Pat. No. 1,543,299; Walsh et al. U.S. Pat. No. 2,278,029; and Agamaite U.S. Pat. No. 2,560,061. The perforating or severing mechanisms used in these dispensers generally include a rotatably mounted knife and a cooperating rotatably mounted roller having a slot therein for receiving the radially outward portion of the knife as the knife rotates past the roller. The web of flexible sheet material is passed between the roller and the knife to be perforated or severed when the radially outward knife portion enters the slot in the roller.

Such mechanisms are satisfactory for perforating or severing relatively unstretchable flexible sheet materials, such as uncreped paper toweling. However, with the increased use of relatively stretchable flexible sheet materials, such as embossed and creped paper toweling, the prior art perforating and severing mechanisms have provided unsatisfactory because the web of sheet material tends to stretch about the cutting edge of the knife instead of being perforated or severed thereby. This problem results principally from the orientation of the cutting edge during the entrance of the radially outward knife portion into the slot; the cutting edge being oriented nonparallel to the direction in which the radially outward knife portion moves with respect to the web, causing the edge to slide along the web. Although precision rotary shears are known which could be employed for obviating this problem, for example, the rotary shears shown in Kalko U.S. Pat. No. 1,989,012, such shears are much too expensive to be used in flexible sheet material dispensers designed for installation in both commercial and private washrooms and kitchens.

SUMMARY OF THE INVENTION

The perforating mechanism of the present invention offers an economical solution to the above-described deficiency of the perforating and severing mechanisms used in the prior art flexible sheet material dispensers.

Basically described, the perforating mechanism of the invention comprises; a chassis, a roller rotatably mounted on the chassis, a knife rotatably mounted on the chassis adjacent the roller and having a radially outward portion defining a cutting edge for perforating a web of flexible sheet material as the web passes between the roller and the knife, the roller being operatively connected to the knife for synchronous rotation therewith and having a slot therein for receiving the radially outward portion as the knife rotates past the roller, and means associated with the knife for orienting the cutting edge substantially in the direction in which the radially outward knife portion moves with respect to the web during the entrance of the portion into the slot so that when the portion enters the slot the cutting edge will effectively perforate the web.

A web guiding means preferably is employed in conjunction with the perforating mechanism which holds the web of flexible sheet material tautly about the roller at all times to further reduce any tendency of the web to stretch about the cutting edge of the knife.

The dispenser of the invention, in which the abovedescribed perforating mechanism is adapted to be used, preferably includes an adjustable stop mechanism for stopping the rotation of the knife and the roller and thus arresting the movement of the web with the perforations last-produced in the web either outside or inside the dispenser so that when an individual sheet of material is torn from the web along such last-produced perforations, the leading edge of the web may or may not be immediately accessible to a user, as desired.

With the foregoing in mind, it is an object of the present invention to provide a flexible sheet material dispenser having a mechanism for effectively perforating a web of flexible sheet material, and particularly a web of relatively stretchable flexible sheet material.

It is also an object of the invention to provide a mechanism for perforating a web of flexible sheet material which mechanism includes a knife and a means for orienting the cutting edge thereof in the direction which is most effective for perforating the web.

It is a further object of the invention to provide a flexible sheet material dispenser which includes an adjustable stop mechanism for regulating the position of the leading edge of a web of flexible sheet material such that the leading edge may be positioned either outside or inside the dispenser and thus be either immediately or not immediately accessible to a user.

It is an additional object of the invention to provide a flexible sheet material dispenser having a mechanism for perforating a web of flexible sheet material, which dispenser embodies a compact and rugged structure and which is economical to manufacture, and thus is ideally suited for both commercial and private installations.

These and other objects of the invention will become apparent upon a consideration of the detailed description of the preferred embodiments thereof given in connection with the following drawings.

BRIEF DESCRIPTION OF THE DRAWINGS

FIG. 1 is a front view of the dispenser of the invention;

FIG. 2 is a right end view of the dispenser shown in FIG. 1;

FIG. 8 is a sectional view taken on line 8—8 of FIG. 7;

FIG. 9 is a sectional view taken on line 9—9 of FIG. 4;

FIG. 10 is an enlarged elevational view of the stop mechanism and associated elements used in the dispenser shown in FIG. 1;

DESCRIPTION OF THE PREFERRED EMBODIMENTS

Figure 3:
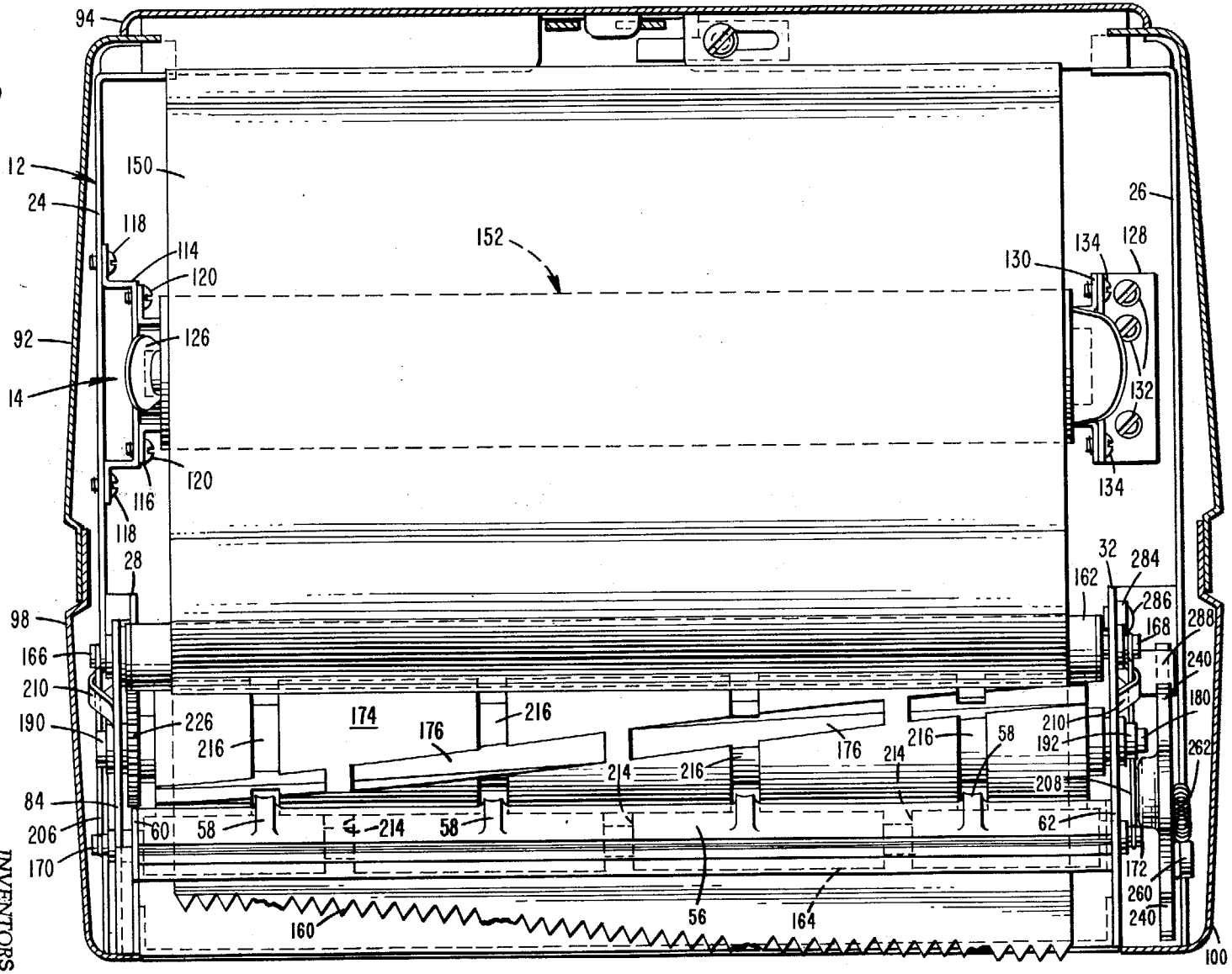
FIG. 3 is a front view of the dispenser shown in FIG. 1 with the housing thereof shown in cross-section.

The dispenser of the invention is designated in the drawings by reference numeral 10, and basically comprises a chassis 12 (FIG. 3), a supporting means 14 (FIG. 6) for rotatably supporting a roll of flexible sheet material, such as a roll of creped paper toweling 150, a guiding means 16 (FIGS. 4 and 5) for guiding a web of paper toweling 160 from roll 150 to a position to be grasped by a user so that the user may pull the web out of dispenser 10, and a perforating mechanism 18 (FIGS. 5 and 8) for perforating web 160 at intervals therealong to divide the web into individual sheets.

THE CHASSIS AND THE HOUSING

Figure 4:
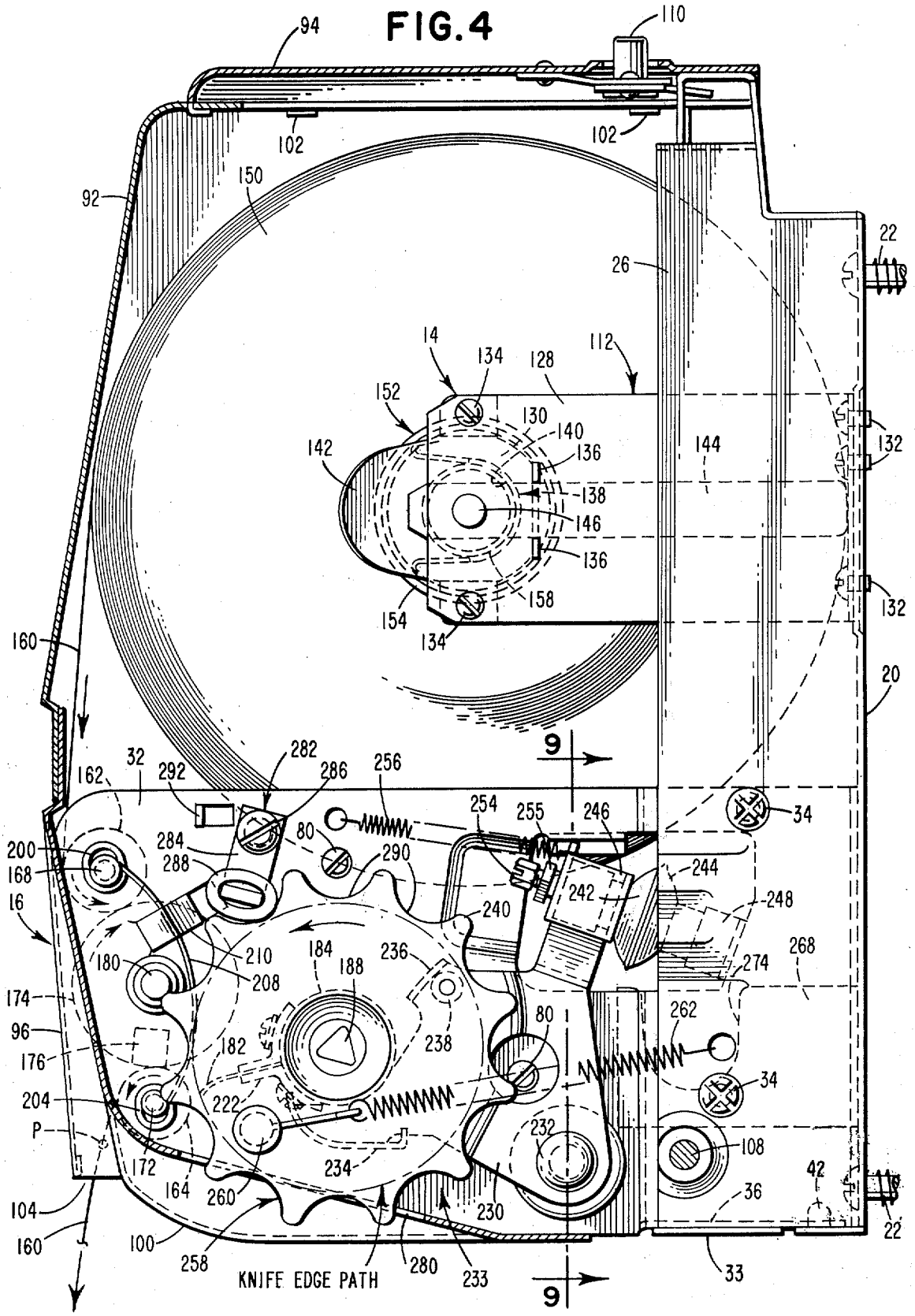
FIG. 4 is a right end view of the dispenser shown in FIG. 1 with the housing thereof shown in cross-section.

Chassis 12 includes a back plate 20 (FIGS. 2 and 4–8) which is adapted to be secured to a wall 21 (FIG. 2) by suitable fasteners, such as screws 22. Integral with back plate 20 are a left end flange 24 (FIG. 5) and a right end flange 26 (FIG. 4). A left end plate 28 is affixed to left end flange 24 by suitable fasteners, such as sheet metal screws 30. A right end plate 32 is similarly affixed to right end flange 26 by suitable fasteners, such as sheet metal screws 34. A bottom plate 36 (FIGS. 4, 5, 7 and 8) extends forwardly from the bottom of back plate 20 and curves upwardly near the front of the dispenser, terminating in an upstanding arcuate portion 38. The rear portion of bottom plate 36 has a plurality of holes 40 therein which register with a corresponding plurality of lugs 42 that are carried by a bottom flange 44 integral with back plate 20. Also, the rear portion of bottom plate 36 is connected to left end plate 28 and right end plate 32 by tabs 29 and 33, respectively; the tabs being integral with the end plates and being spot welded to the bottom plate. The forward portion of bottom plate 36 is connected to left end plate 28 by tabs 46, 47 and 48 (FIG. 5) and to right end plate 32 by tabs 50, 51 and 52 (FIG. 8); the tabs being integral with the bottom plate and being spot welded to the end plates. A plurality of louvers 54 (FIGS. 7 and 8) are formed in bottom plate 36 to permit air to circulate within dispenser 10.

Figure 5:
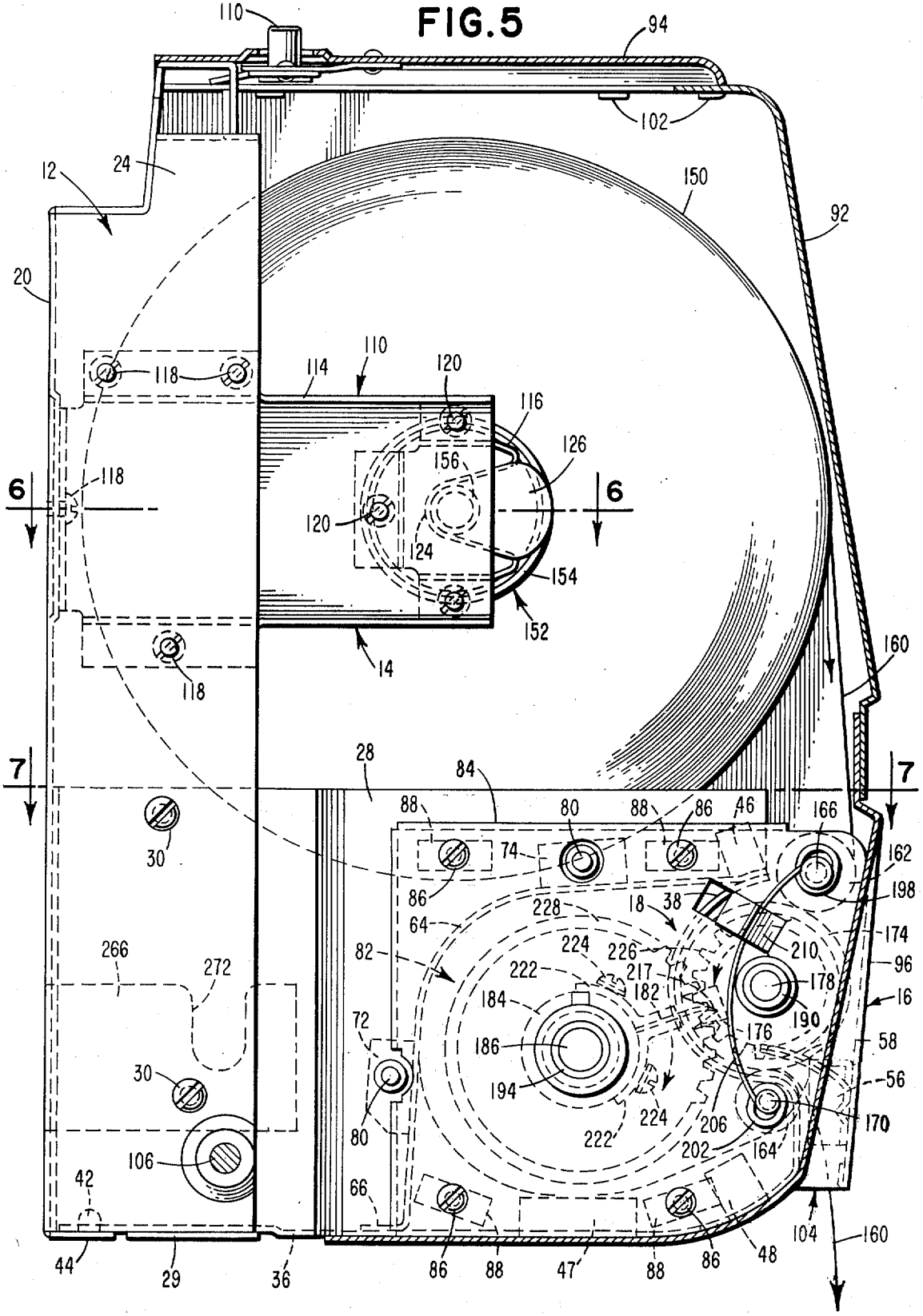
FIG. 5 is a left end view of the dispenser shown in FIG. 1 with the housing thereof shown in cross-section.
Figure 7:
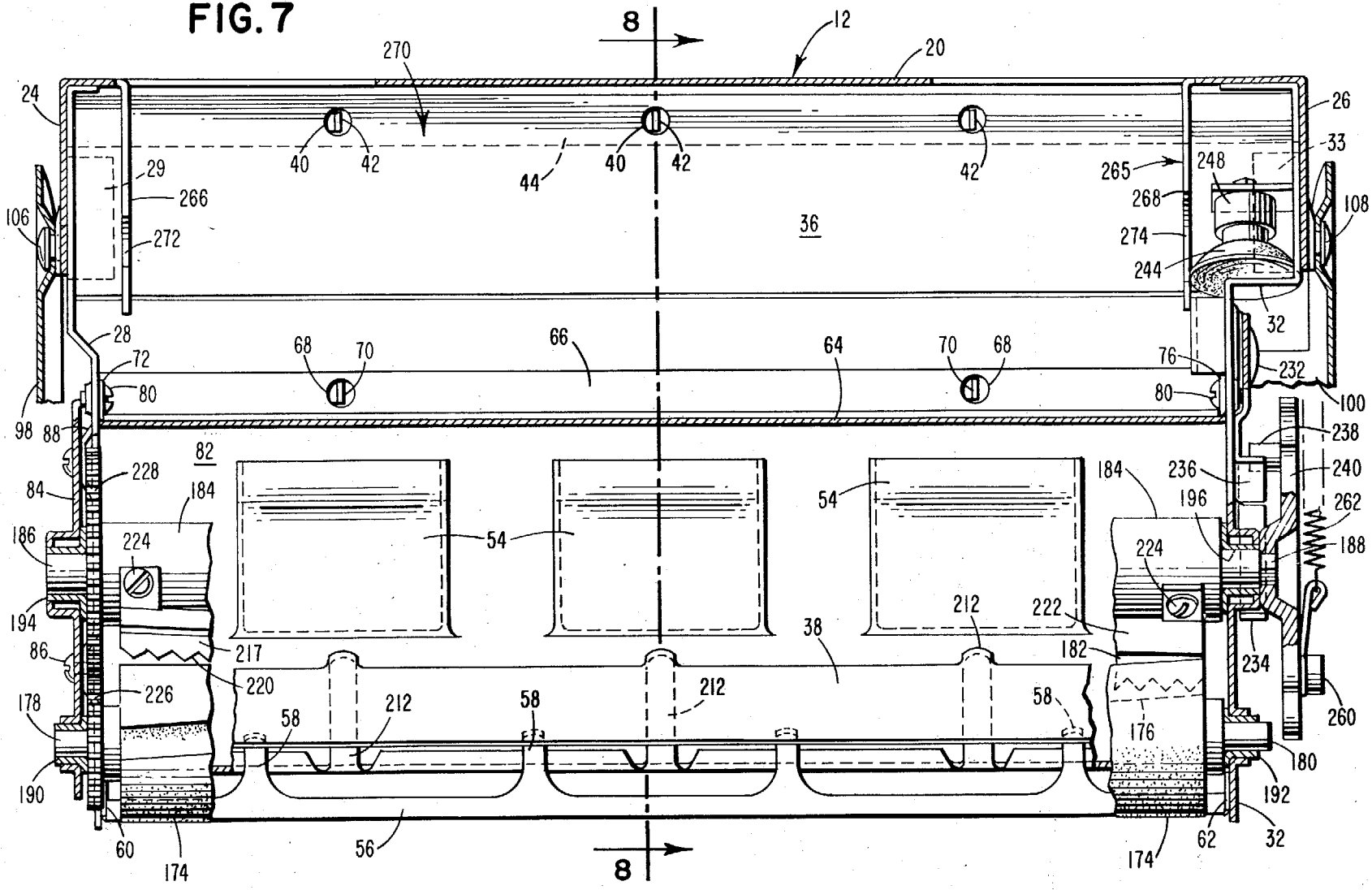
FIG. 7 is a sectional view taken on line 7—7 of FIG. 5 with selected elements of the dispenser being broken away for clarity.
Figure 18:
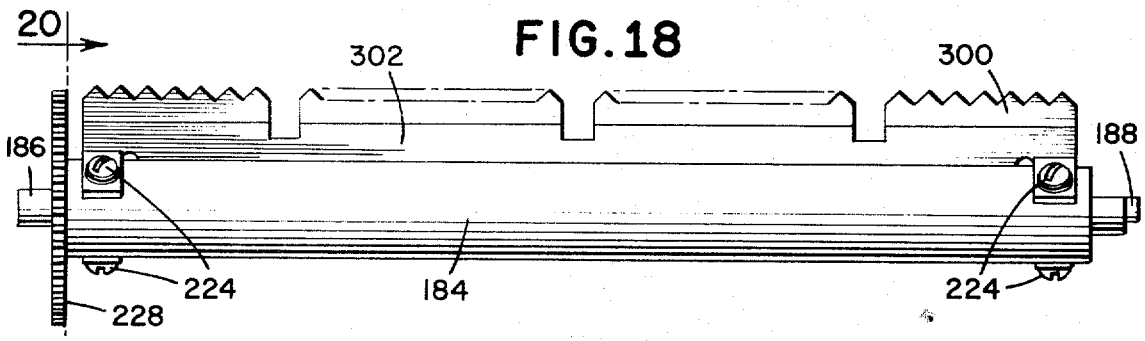
FIG. 18 is an elevational view of a knife roller assembly for rotatably supporting the knife of a second embodiment of the perforating mechanism of the invention, which mechanism also may be used in the dispenser shown in FIG. 1.
Figure 19:
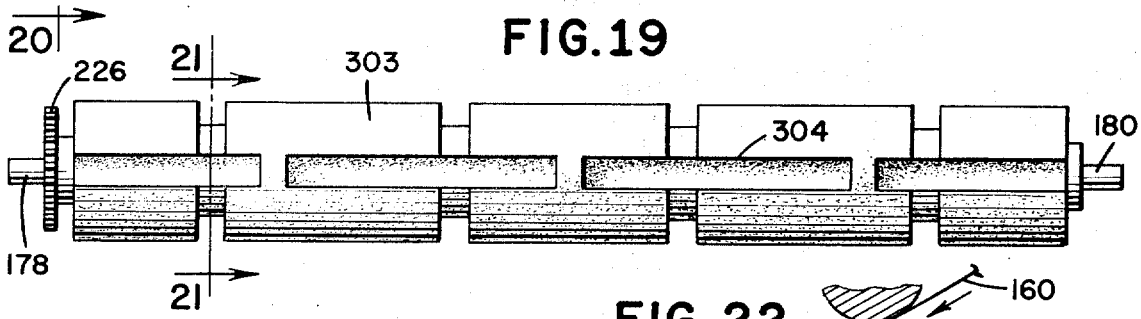
FIG. 19 is an elevational view of the slot roller used in conjunction with the knife shown in FIG. 18.
Figure 20:
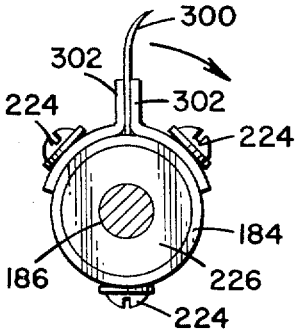
FIG. 20 is a sectional view taken on line 20—20 of FIG. 18.
Figure 21:
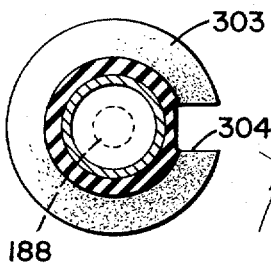
FIG. 21 is a sectional view taken on line 21—21 of FIG. 19.

Chassis 12 also includes a stripper 56 (FIGS. 3, 5, 7 and 8) having a plurality of upstanding arcuate fingers 58, the function of which is described below, and which is attached to left end plate 28 and to right end plate 32 by tabs 60 and 62, respectively; the tabs being integral with the stripper and being spot welded to the end plates. An arcuate shield 64 (FIGS. 5, 7 and 8) extends upwardly from approximately the midpoint of bottom plate 36 and forwardly to the upward extremity of arcuate bottom plate portion 38. The lower portion of shield 64 is defined by a flange 66 having a plurality of holes 68 therein which register with a corresponding plurality of lugs 70 carried by bottom plate 36. The upper portion of shield 64 is connected to left end plate 28 by tabs 72 and 74, and to right end plate 32 by tabs 76 and 78; the tabs being integral with the shield and being attached to the end plates by suitable fasteners, such as sheet metal screws 80. Shield 64 and bottom plate 36 defined an elongated cavity 82 within dispenser 10 within which guiding means 16 and perforating mechanism 18 are disposed. The right end of cavity 82 is enclosed by right end plate 32 and the left end of the cavity is enclosed by a cover plate 84 (FIGS. 5 and 7). Cover plate 84 is connected to left end plate 28 by a plurality of suitable fasteners, such as sheet metal screws 86 which engage a corresponding plurality of bosses 88 formed in the end plate. A removable cover plate, such as plate 84, is used for enclosing the left end of cavity 82 so that access readily may be had to the interior of the cavity for servicing guiding means 16 and perforating mechanism 18.

Chassis 12 is enclosed by a housing 90 (FIGS. 1 and 2). Housing 90 comprises an upper portion 92, a cap portion 94, a lower front portion 96, a lower left end portion 98, and a lower right end portion 100. Cap portion 94 is attached to upper portion 92 by a plurality of tabs 102 (FIGS. 4 and 5). The other portions of the housing are connected together in an appropriate manner, such as by spot welding the portions together where the edges thereof overlap. Lower front portion 96 defines an opening 104 through which web 160 (FIG. 3) may be withdrawn from dispenser 10 by a user, as described below. Lower left and right end portions 98 and 100 each include an integral bottom flange (FIGS. 3–5, 8 and 9) which is adapted to enclose the respective, left or right outer portions of bottom plate 36.

Housing 90 is connected to chassis 12 by pivot pins 106 and 108; pin 106 pivotally connecting lower left end housing portion 98 to left end flange 24 of back plate 20, and pin 108 pivotally connecting lower right end housing portion 100 to right end flange 26 of back plate 20. This arrangement permits housing 90 to be pivoted outwardly about pins 106 and 108 away from chassis 12 to expose the internal elements of dispenser 10. A lock 110 preferably is attached to the rear of cap portion 94 for releasably securing the housing to the chassis to prevent unauthorized access to the interior of the dispenser. Lock 110 preferably is a combination locking and latching device of the type disclosed in U.S. Pat. No. 3,500,667 owned by the assignee of the present application.

THE SUPPORTING MEANS

Supporting means 14 comprises a pair of substantially horizontally opposed supporting members 110 and 112 (FIGS. 3–6). Supporting member 110 (FIGS. 3, 5 and 6) is mounted at the left end of chassis 12 and includes a mounting bracket 114 and a hub 116. Mounting bracket 114 is attached to back plate 20 and left end flange 24 by suitable fasteners, such as sheet metal screws 118. Hub 116 is attached to the forward end of bracket 114 by suitable fasteners, such as sheet metal screws 120. Hub 116 has a recess 122 therein defined by an arcuate bearing surface 124 and the arcuate inner edge of a guide lip 126.

Supporting member 112 (FIGS. 3, 4 and 6) is mounted at the right end of chassis 12 and includes a flexible mounting bracket 128 and a hub 130. Mounting bracket 128 is attached to back plate 20 by suitable fasteners, such as sheet metal screws 132. Hub 130 is attached to the forward end of bracket 128 by suitable fasteners, such as sheet metal screws 134, and carries a pair of lugs 136 which register with a corresponding pair of slots formed in the bracket. Hub 130, similarly to hub 116, has a recess 138 therein defined by an arcuate bearing surface 140 and the inner arcuate edge of a guide lip 142.

A braking spring 144 has one end affixed to the inner surface of hub 130 by as suitable fastener, such as rivet 146, and extends rearwardly from hub 130, between lugs 136, and terminates adjacent back plate 20.

Supporting means 14 is adapted to rotatably support roll 150. The roll preferably is of the type disclosed as the first embodiment (FIGS. 1 – 3) in U.S. Pat. No. 3,438,589 owned by the assignee of the present application. The roll has a unipartite internal supporting means 152 comprising a cylindrical core 154 and a pair of trunnion members 156 and 158 attached to the ends of the core. The outer ends of trunnion members 156 and 158 extend axially outwardly beyond the ends of roll 150, and are adapted to engage recesses 122 and 138, respectively. The outer ends of the trunnion members have different cross-sectional dimensions; and recesses 122 and 138 have different internal dimensions corresponding to the cross-sectional dimensions of the outer ends of the trunnion members. Thus, roll 150 may be supported by supporting means 14 only when each recess is enagaged by the trunnion member outer end having a cross-sectional dimension corresponding to the internal dimension of that recess; and specifically only when recess 122 is engaged by the outer end of trunnion member 156 and recess 138 is engaged by the outer end of trunnion member 158. This feature insures that roll 150 will be placed in dispenser 10 in the proper manner for web 160 to be passed through guiding means 16 and perforating mechanism 18, and out of the dispenser through opening 104.

To insert roll 150 into supporting means 14, the outer ends of trunnion members 56 and 158 are placed against guide lips 126 and 142, respectively, and the roll is then pushed rearwardly. When this occurs bracket 128 will flex outwardly permitting the outer ends of the trunnion members to engage, and seat in, recesses 122 and 138. After the roll has been thus inserted into the supporting means, flexible mounting bracket 128 urges hub 130 toward hub 116 to prevent any inadvertent disengagement of the roll.

Figure 6:
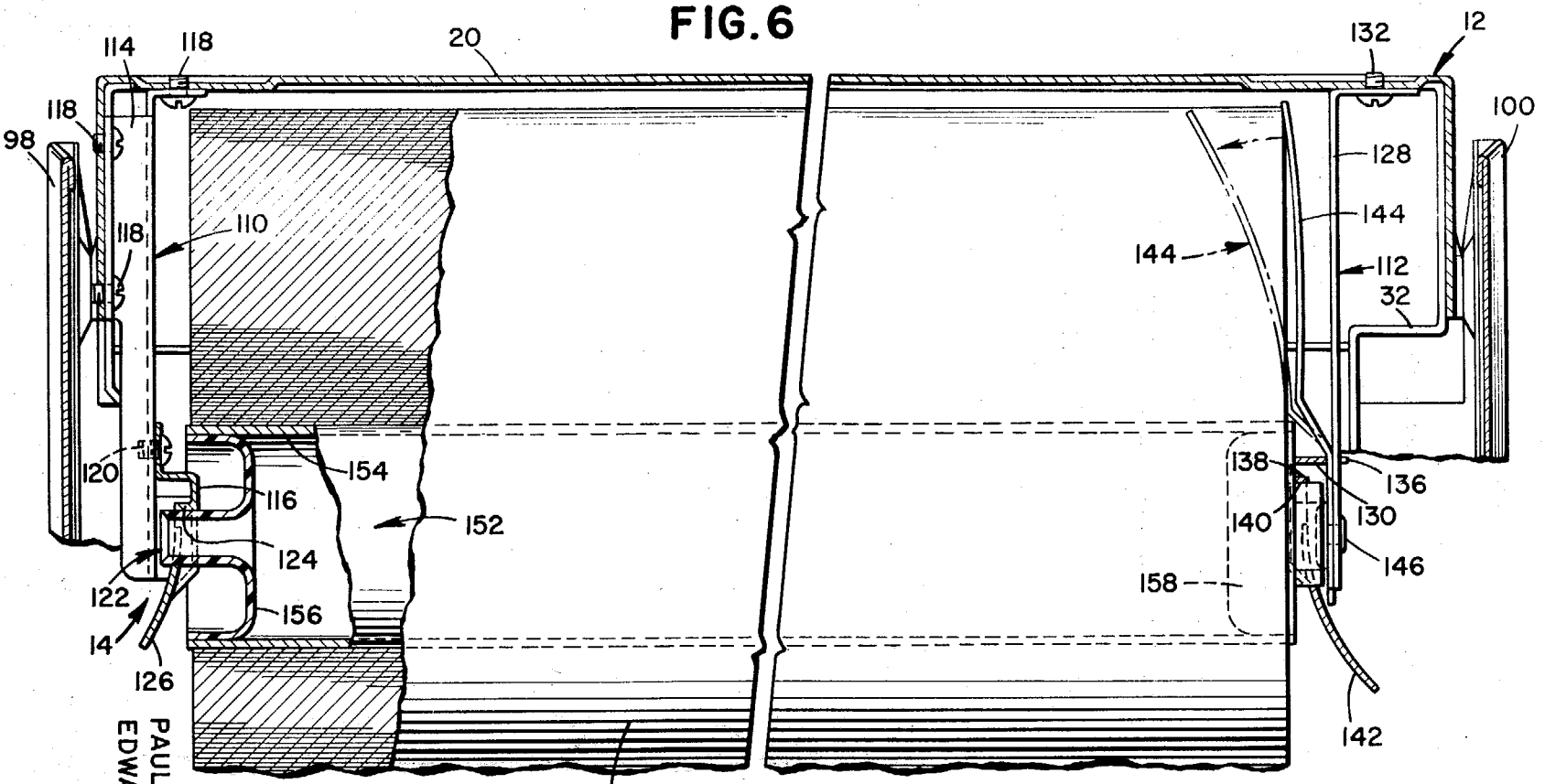
FIG. 6 is a sectional view taken on line 6—6 of FIG. 5.

As the roll is inserted into the supporting means, the roll end nearest spring 144 will contact the spring and move the spring outwardly to the position shown in solid lines in FIG. 6. Thereafter, as web 160 is withdrawn from the roll, spring 144 will frictionally engage the roll end and brake the rotation of the roll, to thus prevent uncontrolled spinning thereof.

THE GUIDING MEANS AND THE PERFORATING MECHANISM

Guiding means 16 includes an upper pinch roll 162 and a lower pinch roll 164 (FIGS. 3 – 5 and 8). Upper pinch roll 162 is mounted on stub shafts 166 and 168 which are journaled for rotation in cover plate 84 and right end plate 32, respectively. Similarly, lower pinch roll 164 is mounted on sub shafts 170 and 172 which are also journaled for rotation in cover plate 84 and right end plate 32, respectively.

Perforating mechanism 18 includes a roller 174 (FIGS. 3 – 5, 7, 8, 15 and 17) which is positioned between pinch rolls 162 and 164 and which has an intermittent helical slot 176 therein. Slot 176 extends generally axially of roller 174 and opens radially outwardly from the surface thereof. The slot roller is supported by stub shafts 178 and 180 which are journaled for rotation in cover plate 84 and right end plate 32, respectively. Perforating mechanism 18 also includes a knife 182 which is rotatably mounted by a roller 184. Roller 184 is supported by stub shafts 186 and 188 which are journaled for rotation in cover plate 84 and right end plate 32, respectively. The bearing surfaces for shafts 178, 186, 180 and 188 preferably comprise low-friction bushings 190, 194, 192 and 196, respectively; the former two bushings being secured to cover plate 84 and the latter two to right end plate 32.

Stub shafts 166, 170, 168 and 172 are journaled by elongated bearing surfaces 198, 202, 200 and 204, respectively; the former two surfaces being integrally formed in cover plate 84 and the latter two being integrally formed in right end plate 32. This arrangement permits each of the pinch rolls to move into contact with slot roller 174 to form a nip therebetween. A biasing spring 206 is connected to stub shafts 166 and 170, and a similar biasing spring 208 is connected to stub shafts 168 and 172 for urging the pinch rolls toward the slot roller. Biasing springs 206 and 208 are held in position by U-shaped brackets 210, one of which is attached to cover plate 84 and another of which is attached to right end plate 32 in any convenient manner, such as by spot welding. In order to permit the surfaces of lower pinch roll 164 and slot roller 174 to contact one another, the upstanding arcuate portion 38 of bottom plate 36 comprises a plurality of spaced apart, relatively narrow arcuate strips 212 (FIG. 7), and pinch roll 164 has a plurality of circumferential slots 214 therein (FIG. 3), within which strips 212 are accommodated.

From roll 150, web 160 is directed around upper pinch roll 162, between the upper pinch roll and slot roller 174, around the slot roller, between the slot roller and lower pinch roll 164, around the lower pinch roll and out of the dispenser through opening 104. As will be apparent from the foregoing description, pinch rolls 162 and 164 insure that web 160 will be held tautly about slot roller 174 at all times. When a user withdraws the web from the dispenser by exerting a pulling force on the leading edge thereof, pinch roll 164 will move slightly out of contact with slot roller 174; however, as soon as the pulling force is relaxed biasing springs 206 and 208 will immediately move the pinch roll back into contact with the slot roller.

Slot roller 174 also has a plurality of circumferential slots 216 therein, within which are accommodated fingers 58 of stripper 56. Fingers 58 insure that web 160 will be directed out of opening 104 instead of adhering to the slot roller and becoming wound thereabout.

Knife 182 is helically twisted along the length thereof and includes a radially outward portion 217 which is curved forwardly in the direction of rotation of the knife and which defines a serrated cutting edge 220 (FIGS. 4, 5, 7, 8, 12, 14 and 16). The knife also has a plurality of notches 218 therein within which strips 212 of bottom plate portion 38 are accommmodated as the knife rotates into proximity with and past slot roller 174. As the knife rotates past the slot roller, radially outward knife portion 217 enters slot 176 and cutting edge 220 progressively perforates the entire width of web 160 except for the sections of the web that are aligned with notches 218. The unperforated sections of the web have sufficient tensile strength to permit a user to draw the web out of the dispenser by exerting a smooth, continuous pulling force thereon. However, after the web has been perforated, an abrupt increase in the pulling force will cause the web to part along the perforations last-produced therein by cutting edge 220.

Figure 13:
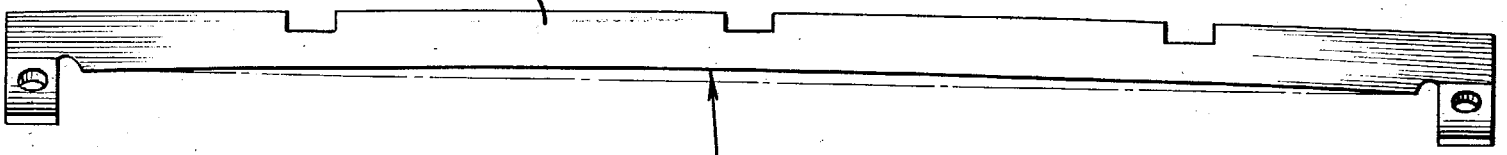
FIG. 13 is an elevational view of one of the knife mounting brackets for the knife shown in FIG. 12.
Figure 14:
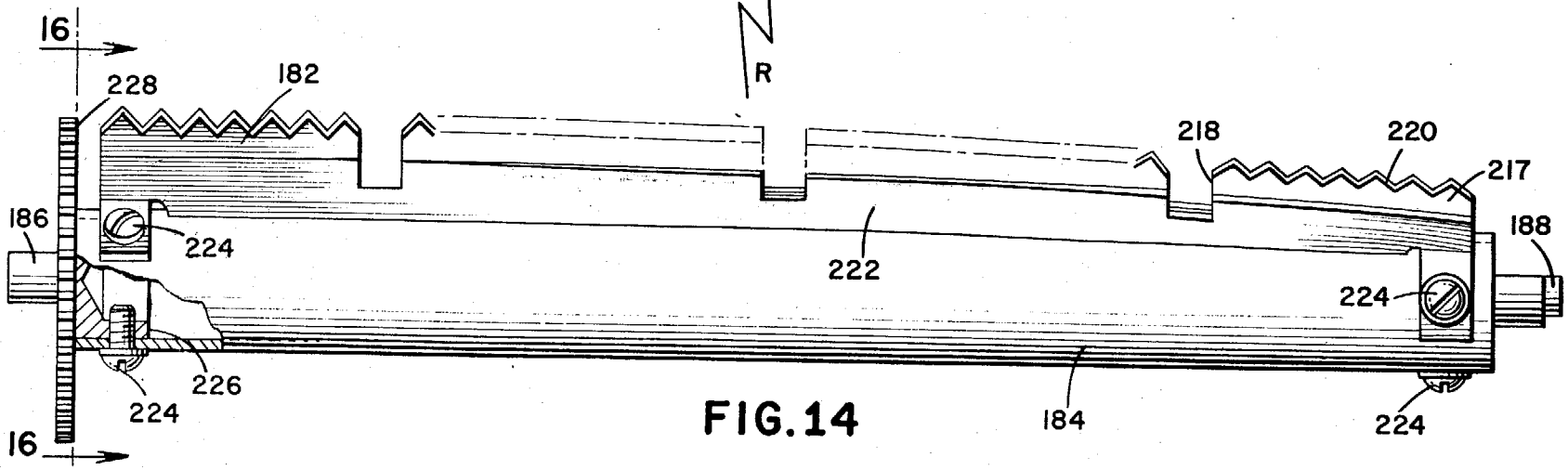
FIG. 14 is an elevational view of a knife roller assembly for rotatably supporting the knife shown in FIG. 12.
Figure 15:
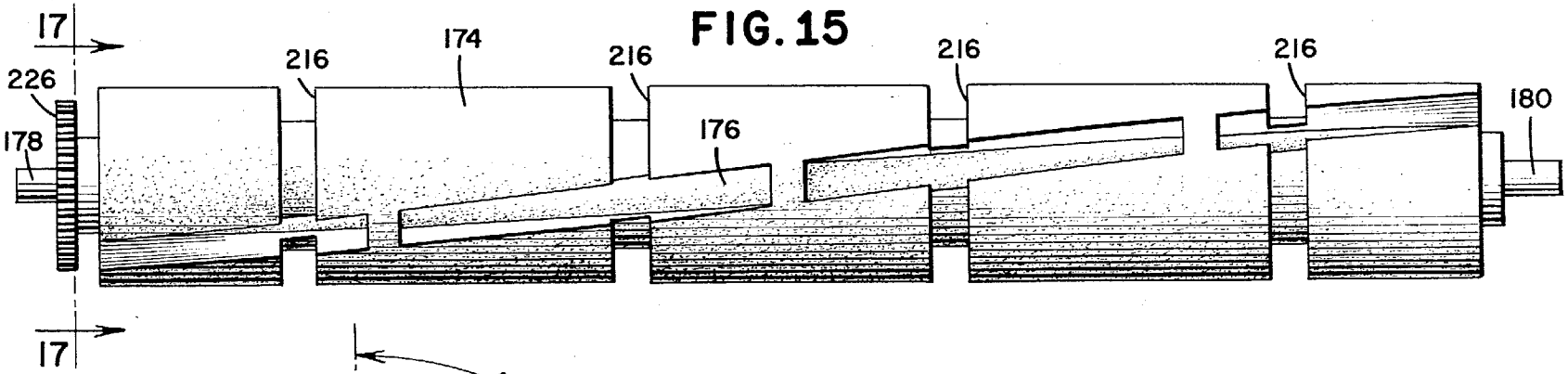
FIG. 15 is an elevational view of the slot roller used in conjunction with the knife shown in FIG. 12.

Knife 182 is attached to knife roller 184 by a pair of mounting brackets 222. The knife is first affixed to the mounting brackets, conveniently by welding, and a helical twist is then imparted to the knife and the brackets. The brackets are thereafter attached to roller 184 by a plurality of bolts 224 which threadably engage a pair of hubs 226 disposed internally of the roller at the ends thereof. The knife and mounting brackets are bowed slightly outwardly at the centers thereof (FIGS. 12 and 13) so that after the helical twist is imparted thereto, the entirety of the radially inward surfaces thereof will abut the surface of roller 184. Additional bolts 224 may be used for securing roller 184 to hub 226 to insure that the hubs are firmly anchored within the roller.

Figure 17:
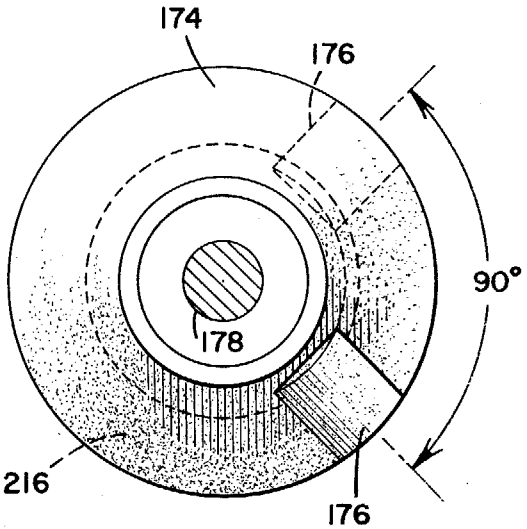
FIG. 17 is a sectional view taken on line 17—17 of FIG. 15.
Figure 16:
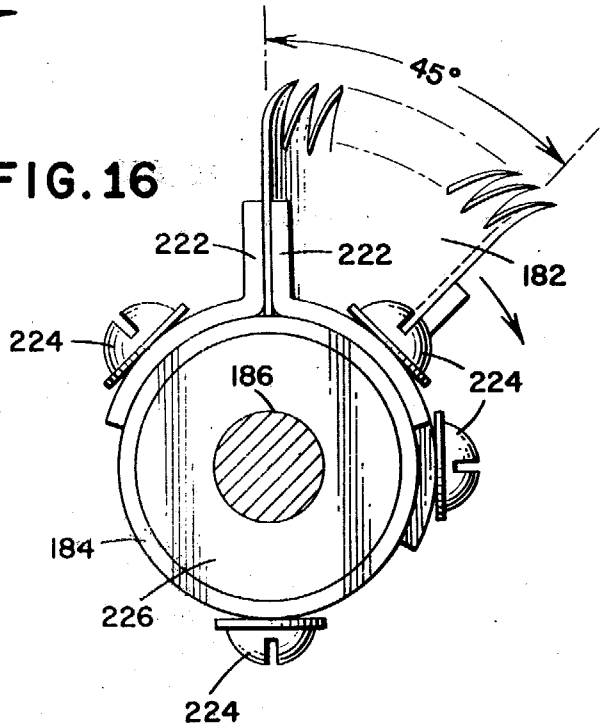
FIG. 16 is a sectional view taken on line 16—16 of FIG. 14.

Slot roller 174 and knife roller 184 are operatively interconnected to insure that the rollers will rotate in synchronism with one another. For this purpose a gear 226 is affixed to one end of the slot roller which engages and meshes with a gear 228 affixed to the same end of the knife roller. In the embodiment shown in the drawings, gear 228 has twice as many teeth as does gear 226, so that the slot roller will rotate at twice the rotational speed of the knife roller. Due to this difference in the rotational speeds of the two rollers, slot 176 must be twisted through an arc which is twice as large as the arc through which the knife 182 is twisted. Thus, the knife may be helically twisted through an arc of 45° (FIG. 16) and slot 176 helically twisted through an arc of 90° (FIG. 17).

To preclude slippage of web 160 about the slot roller, the roller preferably is made from a substance having a relatively high coefficient of friction, such as rubber. When a user exerts a pulling force on the leading edge of the web, the frictional force exerted by the web on the slot roller causes the slot and knife rollers to rotate in synchronism with one another.

Figure 23:
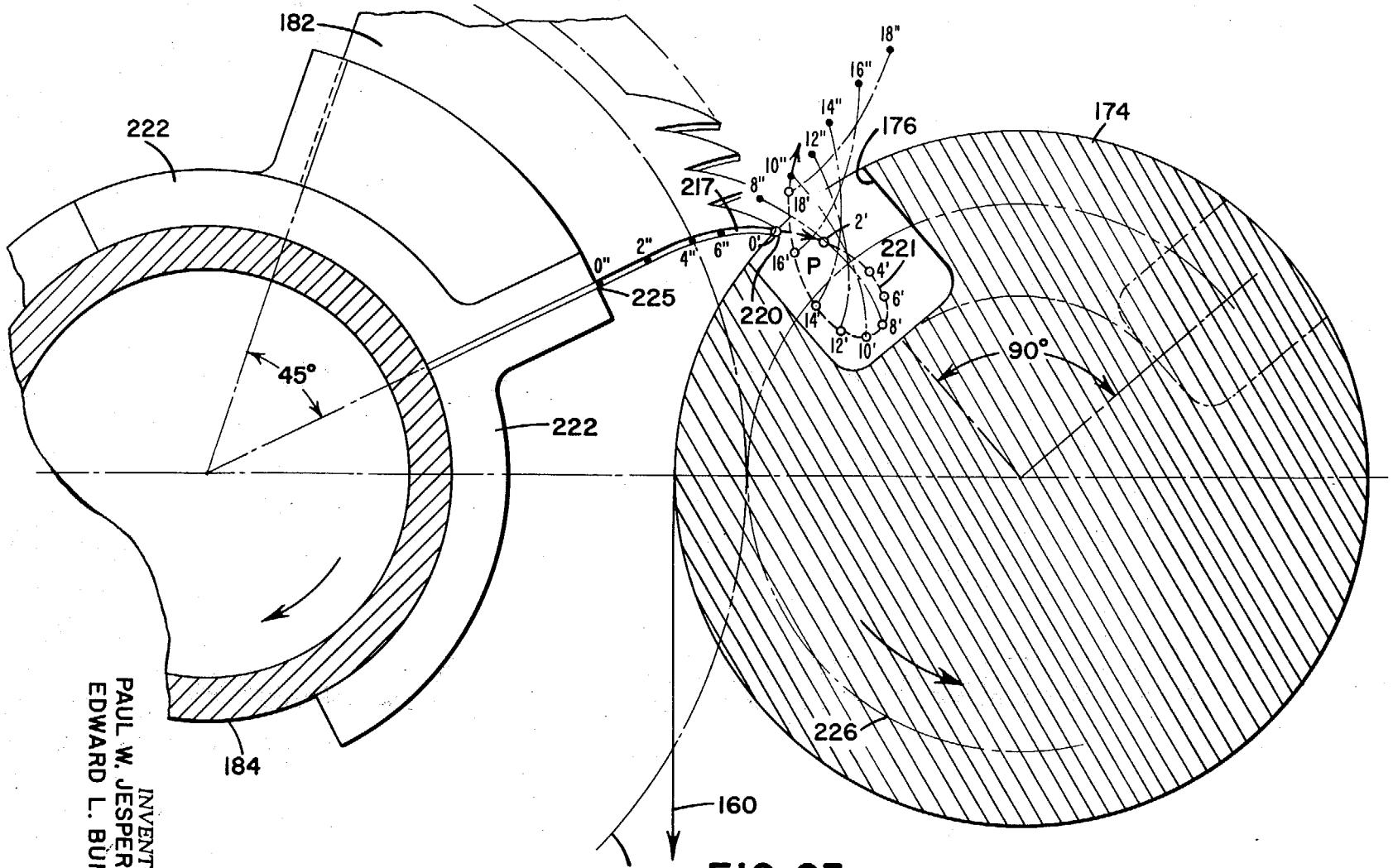
FIG. 23 is a diagrammatic-sectional view showing the operation of the perforating mechanism which is composed of the knife roller assembly shown in FIG. 14 and the slot roller shown in FIG. 15.

The path of movement of cutting edge 220 with respect to slot 176 during the perforating cycle of the knife is shown in FIG. 23 by dashed line 221. Also shown in this figure are the relative positions of edge 220 and a point 225 on the knife located at the radially outward extremity of brackets 222; the positions of the former by points 0', 2', 4', 6', 8', 10', 12', 14', 16' and 18', and the corresponding positions of the latter by points 0'', 2'', 4'', 6'', 8'', 10'', 12'', 14'', 16'' and 18''.

The positions of radially outward knife portion 217 with respect to slot 176 during the perforating cycle are indicated by the broken lines which connect the corresponding positional points of edge 220 and point 225 i.e., lines 0' — 0'', 2' — 2'', 4' — 4'', 6' — 6'', 8' — 8'', 10' — 10'', 12' — 12'', 14' — 14'', 16' — 16'' and 18' — 18''. As shown, while portion 217 is moving from position 0' — 0'' to position 6' — 6'', i.e., during the entrance of the portion into slot 176, cutting edge 220 is oriented substantially in the same direction as the direction in which portion 217 is moving.

The same relationship between the orientation of the cutting edge and the movement of portion 217 is maintained with respect to web 160 as is maintained with respect to slot 176. Thus, as described above, web 160 is held tautly about slot roller 174 by pinch rolls 162 and 164 and by the pulling force exerted on the web by a user. As a consequence of this feature when slot 176 rotates into proximity with knife 220 the portion of the web which overlies the slot is curved in conformance with the curvature of the surface of roller 174, and there is no relative movement therebetween. Thereafter, when portion 217 reaches position 0' — 0'' and slot 176 reaches the position shown in FIG. 23, i.e., when cutting edge 220 initially contacts web 160, the orientation of the cutting edge substantially coincides with the direction in which portion 217 is moving with respect to the web. This relationship is maintained as portion 217 moves from position 0' — 0'' to position 6' — 6'', i.e., during the entrance of the portion into the slot. Thus, the forward curvature of portion 217 orients cutting edge 220 substantially in the direction in which portion 217 moves with respect to the web, as well as with respect to slot 176, during the entrance of the portion into the slot.

The structure and resulting operation of perforating mechanism 18 provides several advantages over the prior art perforating and severing mechanisms. The orientation of the cutting edge results in an effective perforation of the flexible sheet material web by reducing any tendency of the edge to slide along the web. Also, the mechanism is economical to manufacture, and embodies a rugged and compact structure which is able to withstand the prolonged and abusive wear encountered in commercial washroom and kitchen installation.

THE STOP MECHANISM AND THE TIMING MEANS

Dispenser 10 also includes a mechanism 223 (FIGS. 4 and 10) for stopping the rotation of knife roller 184 and slot roller 176 abruptly and thus arresting the movement of web 160 abruptly, so that an individual sheet of paper toweling may be torn from web 160 along the perforations last-produced therein by knife 182. Stop mechanism 233 includes stop lever 230 which is pivotally connected to right end plate 32 by a pivot pin 232 and has a cam follower 234 and a stop lug 236 integrally affixed thereto. The stop mechanism also includes a feed wheel 240 which is secured to the end of stub shaft 188, being one of the shafts which support knife roller 184, and has a camming pin 238 affixed thereto. Camming pin 238 is adapted to coact with camming pin 234 and stop lug 236 to stop the rotation of knife roller 184 and slot roller 174. As the knife roller is rotated incident to the exertion of a pulling force on web 160 by a user, camming pin 238 is rotated about the axis of shaft 188. While the knife roller is rotating, stop lever 230, cam follower 234 and stop lug 236 are in the positions shown in full lines in FIG. 10. In this position, the cam follower is positioned in the rotational path of camming pin 238, so that when the pin reaches the position shown in full lines in FIG. 10, it engages the underside of, and cams the follower upwardly. This action pivots stop lever 230, cam follower 234 and stop lug 236 to the positions shown in dotted lines in FIG. 10. In this position, the stop lug is positioned in the rotational path of camming pin 238, so that when the pin disengages the underside of the cam follower, it thereafter engages the stop lug. This causes knife roller 184 and slot roller 174 to stop abruptly and thus abruptly arrests the movement of web 160, resulting in an abrupt increase in the pulling force exerted on the web. As explained above, this permits an individual sheet of paper toweling to be torn from the web along the perforations last-produced therein by knife 182.

A timing means 237 is associated with stop mechanism 233 for regulating the length of time during which the stop mechanism is effective for preventing the rotation of the knife and slot rollers. Timing means 237 comprises a pair of opposed, resilient vacuum cups 242 and 244; cup 242 being connected by a racket 246 to stop lever 230 and cup 244 being attached by a mount 248 to a flange integral with right end plate 32. When camming pin 238 engages the underside of cam follower 234 and pivots stop lever 230 upwardly to position stop lug 236 in the rotational path of the camming pin, vacuum cup 242 is pivoted rearwardly into vacuum-gripping relationship with cup 244. As long as cups 242 and 244 remain in the rotational path of camming pin 238 and prevent knife roller 184 and slot roller 174 from being rotated.

Preferably, vacuum cup 242 is made of a relatively hard resilient material, such as hard rubber, and vacuum cup 244 is made of a relatively soft resilient material, such as soft rubber. This arrangement minimizes the compression force required to engage the cups in vacuum-gripping relationship, yet provides a sufficient vacuum-gripping force between the cups, i.e., the force required to pull the cups apart, to insure that the cups will not be pulled apart when camming pin 238 engages stop lug 236. The resiliency of cups 242 and 244, and particularly of relatively soft resilient cup 244, provides a cushion for absorbing the dynamic forces generated by the abrupt engagement of pin 238 with lug 236 and thus minimizes wearing of the stop mechanism components.

Figure 11:
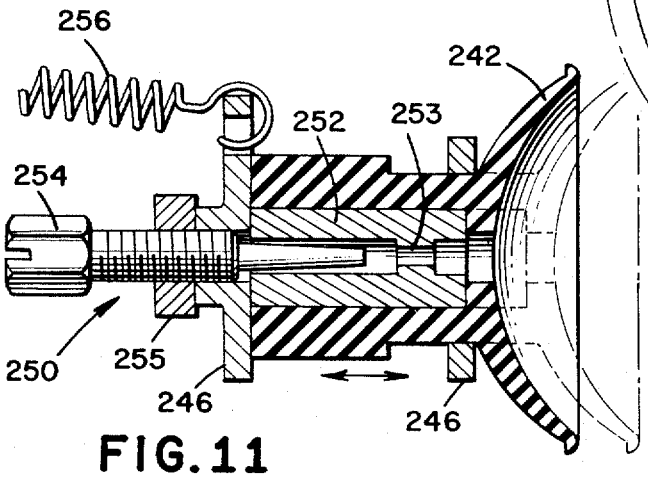
FIG. 11 is a sectional view of one of the vacuum cups of the timing means used in the dispenser shown in FIG. 1.
Figure 12:
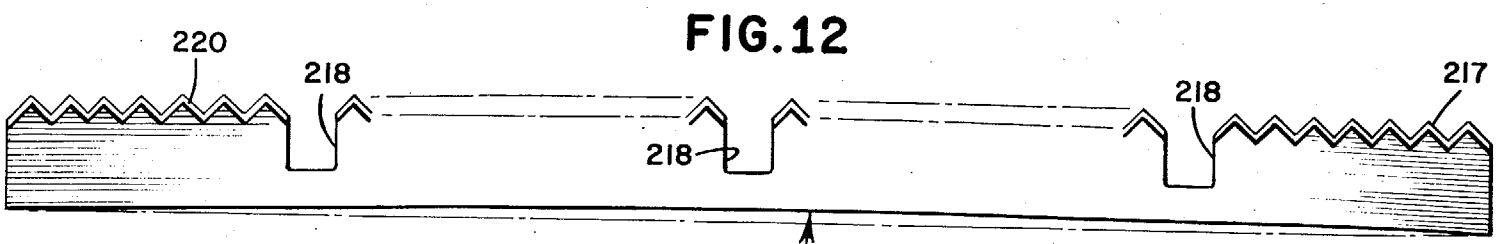
FIG. 12 is an elevational view of the knife of a first embodiment of the perforating mechanism of the invention, which mechanism may be used in the dispenser shown in FIG. 1.

To regulate the period of time during which cups 242 and 244 remain in vacuum-gripping relationship, a needle valve 250 (FIG. 11) is provided for controlling the flow of ambient air into the vacuum environment between the cups. Valve 250 is mounted in bracket 246 and communicates with the interior of cup 242. The valve includes a cylindrical valve body 252 having an aperture 253 formed therein, and a needle-tipped adjustment bolt 254 which threadably engages an end flange of bracket 246. Bolt 254 is locked into position by a lock nut 255 which is also threadably engaged by the bolt and which abuts the end flange of bracket 246. By adjusting the position of bolt 254 with respect to aperture 253, the rate at which ambient air flows into the vacuum environment between vacuum cups 242 and 244, and thus the period of time during which the cups remain in vacuum-gripping relationship, may be regulated. A return spring 256 is connected between bracket 246 and the forward portion of right end plate 32 for pivoting stop lever 230 downwardly, and thus moving stop lug 236 out of the rotational path of camming pin 238, when the air pressure within the environment between vacuum cups 242 and 244 has increased sufficiently to destroy the vacuum-gripping relationship between the cups. The user may thereafter withdraw a further length of web 160 from the dispenser, which will be perforated by knife 182 in the manner described above and which may be torn from the web as an individual sheet of paper toweling when stop mechanism 233 again stops the rotation of knife roller 184 and slot roller 174.

As mentioned above, feed wheel 240 is secured to the end of stub shaft 188. Preferably, the wheel is secured to the shaft by a bolt (not shown) which threadably engages the shaft axially thereof. The cross-section of the end of shaft 188 is shaped as an equilateral triangle (FIGS. 4 and 10), and feed wheel 240 has a similarly shaped opening in the center thereof for accommodating the shaft end therein. The feed wheel may thus be secured to shaft 188 in any one of three rotational positions. In one rotational position of the feed wheel (FIG. 4) camming pin 238 engages stop lug 236 and the rotation of the knife and slot rollers stopped before the perforations last-produced in web 160, indicated at P, have been drawn outside dispenser 10. After a user has torn an individual sheet of paper toweling from the web with the last-produced perforations inside the dispenser, the leading edge of the web will thereafter by positioned within the dispenser and thus not be immediately accessible to the user. This mode of operation encourages economical consumption of roll 150.

After the time period has elapsed during which timing means 237 maintains stop mechanism 233 effective for preventing the rotation of the knife and slot rollers, the knife and slot rollers are rotated automatically by a feed means 258 to move the leading edge of the web outside the dispenser. Feed means 258 comprises a lug 260 affixed to feed wheel 240 and a feed spring 262 connected between lug 260 and the rear portion of right end plate 32. Lug 260 is positioned with respect to camming pin 238 so that spring 262 will be extended when the camming pin engages stop lug 236 (FIG. 4). Thus, when the stop lug is moved out of the rotational path of pin 238 by return spring 256, feed spring 262 will contract and thereby impart rotation to feed wheel 240 and shaft 188. Shaft 188 in turn will impart rotation to knife roller 184 and slot roller 174, thus moving the leading edge of web 160 outside the dispenser.

In the second rotational position of feed wheel 240 with respect to shaft 188 (FIG. 8) stop mechanism 233 will stop the rotation of the knife and slot rollers after the perforations last-produced in web 160, indicated at P are outside dispenser 10. In this mode of operation, the leading edge of the web is immediately accessible to a user after an individual sheet of toweling has been torn therefrom along the perforations last-produced therein. When this mode of operation is employed, bolt 254 preferably is adjusted so that the time period during which the stop mechanism is effective for stopping the rotation of the knife and pinch rollers is of short duration, i.e., 1 – 2 seconds, permitting a second sheet of toweling to be obtainable as soon as the first sheet is torn from the web. As is apparent, this second mode of operation is less economical than the first mode, but is more convenient to the user's needs than the first mode. The first mode generally would be employed where economical consumption of the paper toweling is a significant factor, such as in commercial washroom installations, and the second mode employed where user convenience is a significant factor, such as in a private kitchen installation. Dispenser 10 is thus ideally suited for either commercial or private installations.

The third rotational position of feed wheel 240 with respect to shaft 188 is not used because in this latter position, knife portion 217 would be within slot 176 when the stop mechanism stopped the rotation of the knife and slot rollers. This would not only permit the web to be at least partially torn along the perforations being produced therein at that time, thus dividing the web before the perforations have passed between slot roller 174 and lower pinch roller 164, but also would impose undesirable bending forces on blade 182.

Dispenser 10 also includes a means 265 for rotatably supporting a partially consumed roll of flexible sheet material, such as a partially consumed roll or creped paper toweling 264 (FIG. 8). Supporting means 265 comprises a pair of opposed flanges 266 and 268, which are integral with back plate 20 (FIGS. 4, 5, 7 and 8). Flanges 266 and 268 extend forwardly from back plate 20 into a cavity 270 in the lower rear portion of the dispenser defined by the back plate, bottom plate 36 and shield 64. Each of the flanges has a U-shaped cutout therein; flange 266 having cutout 272 therein and flange 268 having cutout 274 therein. The internal dimensions of cutouts 272 and 274 corresponding to the cross-sectional dimensions of the outer ends of trunnion members 156 and 158, respectively. Thus, after roll 150 has been partially consumed, being then designated roll 264, the roll may be moved from supporting means 14 to supporting means 265. When the roll is moved from supporting means 14 to supporting means 265, it is not necessary to withdraw web 160 from guiding means 16 and perforating mechanism 18. The trunnion members are simply disengaged from supporting members 110 and 112, and inserted into cutouts 272 and 274. From this latter position the web extends along path 276 (FIG. 8) from the top of roll 264 to the top of upper pinch roller 162.

After partially consumed roll 264 has been moved into cavity 270, a fresh roll 150 may be inserted into supporting means 14 in the manner described above. The web from roll 150 is merely superimposed on the web from roll 264 and is passed through guiding means 16 and perforating mechanism 18 in the manner described above. Thereafter, as long as any paper toweling remains wound about partially consumed roll 264, dispenser 10 will dispense a double-ply thickness of the toweling.

This latter feature of the dispenser is particularly suited for commercial installations where it is uneconomical to service the dispenser except at regular intervals, such as daily. In such instances, a custodian need not wait until a roll is completely consumed before servicing the dispenser; nor need he discard a partially consumed roll when servicing the dispenser at the end of a regularly established service interval. He merely moves the partially consumed roll from supporting means 14 to supporting means 265, and inserts a fresh roll into the former supporting means. To facilitate the custodian's appraisal as to whether or not a fresh roll need be placed in the dispenser at the end of a regularly established service interval, viewing ports 278 (FIG. 2) are provided in upper housing portion 92 adjacent an end of roll 150. By observing the diameter of the roll through ports 278, the custodian will be appraised of the amount of toweling remaining on the roll.

To load dispenser 10, housing 90 is first pivoted outwardly from about chassis 12, thus exposing the internal elements of the dispenser. A roll of flexible sheet material, such as roll 150, is then inserted into supporting means 14 as described above. The web from the roll, such as web 160, is directed around upper pinch roll 162, with the leading edge of the web resting on the forward surface of slot roller 174. Housing 90 is then pivoted upwardly about chassis 12 to enclose the internal elements of the dispenser. Feed wheel 240 is thereafter turned in a counter-clockwise direction as viewed from the right end of the dispenser, causing the web to be fed through guiding means 16 and perforating mechanism 18. Arcuate strips 212 and lower pinch roll 164 insure that the web will be guided, and held tautly, about slot roller 174. To permit the feed wheel to be manipulated when the internal elements of the dispenser are enclosed by housing 90, a slot 280 is provided in lower right end housing portion 100, through which the lower portion of feed wheel 240 extends (FIG. 4).

Dispenser 10 also includes means for preventing feed wheel 240 from being rotated in the direction opposite to the proper direction for feeding web 160 through the guiding means and the perforating mechanism. Such means include a ratchet mechanism 282 (FIG. 4) comprising an L-shaped pawl 284 which is pivotally connected to right end plate 32 by a pin 286. Inserted over the base of the pawl is a resilient sleeve 288 which engages a plurality of notches 290 formed in periphery of feed wheel 240. As long as the feed wheel is rotated in the counter-clockwise direction as viewed from the right end of dispenser 10, the base of pawl 284 and sleeve 288 pivot freely in and out of notches 290. However, any attempt to rotate the feed wheel in the opposite direction will cause the pawl to bind in one of the notches and prevent rotation of the wheel. A lug 292 carried by right end plate 32 is positioned above pawl 284 to prevent the pawl from rotating completely about pin 286, thus insuring that the pawl will remain in the proper position with respect to feed wheel 240 to prevent improper rotation of the wheel.

THE SECOND EMBODIMENT OF THE PERFORATING MECHANISM

A second embodiment of the perforating mechanism of the invention is shown in FIGS. 18–21. This latter embodiment of the perforating mechanism may be employed in dispenser 10 instead of mechanism 18, and includes an axially straight knife 300 which is attached to axially straight mounting brackets 302. In all other respects the knife roller assembly of the second embodiment is identical to the knife roller assembly of the first embodiment, including knife roller 184, stub shafts 186 and 188, and gear 228.

A slot roller 303 is used in conjunction with knife 300. Roller 303 is similar to slot roller 174, except that instead of an intermittent helical slot along the length thereof, roller 303 has an intermittent axially straight slot 304 therein for accommodating the radially outward portion of knife 300.

The only difference in operation between the first and second perforating mechanism embodiments is that helically twisted knife 182 of the first embodiment perforates the web progressively, with only a small section of the cutting edge contacting the web at any one time. This arrangement requires only a relatively small force to be exerted against the web by the cutting edge to accomplish an effective perforation. The cutting edge of knife 300, on the other hand, perforates the entire width of the web at one time, requiring a slightly greater perforating force. The advantage of the second embodiment over the first is that the latter is somewhat more economical to manufacture, since the knife and mounting brackets need not be helically twisted.

THE THIRD EMBODIMENT OF THE PERFORATING MECHANISM

Figure 22:
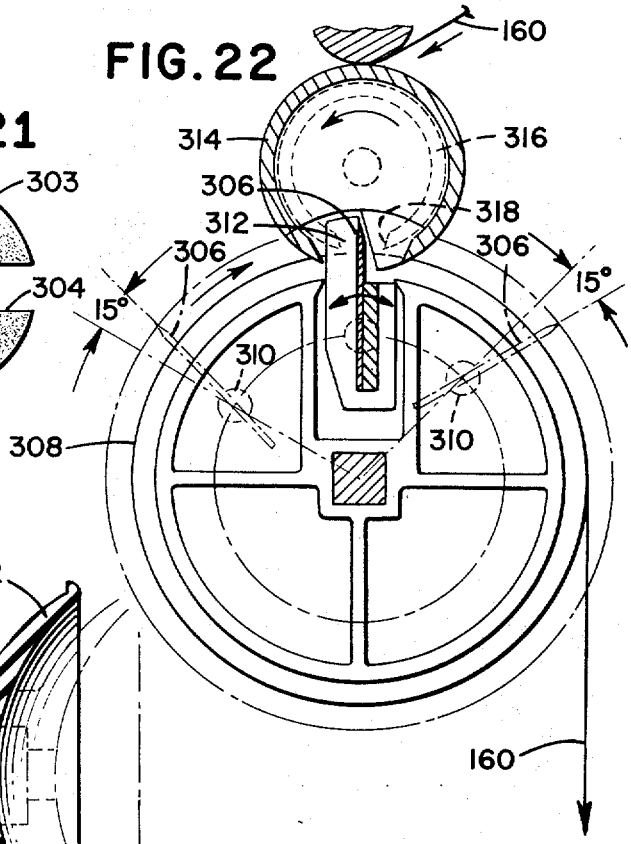
FIG. 22 is a schematic sectional view of a third embodiment of the perforating mechanism of the invention which mechanism also may be used in the dispenser shown in FIG. 1.

A third embodiment of the perforating mechanism of the invention is shown in FIG. 22. This embodiment also may be employed in dispenser 10 instead of the first or second embodiments described above. The third embodiment of the perforating mechanism includes a substantially planar knife 306 which is pivotally mounted on a knife roller 307 by a pair of stub shafts 310 affixed to each end of the knife and journaled in the ends of the knife roller. Also affixed to each end of knife 306 are camming lugs 312 which extend radially outwardly beyond the cutting edge of the knife. Lugs 312 ae adapted to be engaged by cams 314 mounted on each end of a slot roller 316 having an axial slot 318 therein. As opposed to the previous embodiments, the surfaces of the knife roller 308 and slot roller 316 contact each other, thereby eliminating the necessity for a lower pinch roll for maintaining web 160 taut about the slot roller.

Knife 306 is normally biased forwardly by a small spring (not shown) through an arc of approximately 15° from a radial orientation with respect to roller 308. Thus, when the knife enters slot 318, the cutting edge thereof will be oriented substantially in the same direction as the direction in which the radially outward portion of the knife is moving with respect to web 106. In this respect, the perforating action of knife 306 is similar to the perforating action of knives 182 and 300, described above.

After knife 306 moves into the slot, lugs 312 will be engaged by cams 314. The cams pivot the lugs, and therefore knife 306, rearwardly with respect to the direction of rotation of knife roller 308. This action permits slot 318 to be made narrow enough for the knife to perform an effective perforation while maintaining the surfaces of the knife and slot rollers in contact with each other. After the knife has been withdrawn from the slot and lugs 312 have disengaged cams 314, the biasing spring will again pivot knife 306 forwardly. To insure that knife roller 308 and slot roller 316 rotate in synchronism with each other, the rollers preferably are operatively connected together by gears, as described above in connection with the first and second perforating mechanism embodiments.

The foregoing constitutes a detailed description of the dispenser and perforating mechanism of the invention, the latter being adapted to be used in the former, although not being restricted to use solely therein. Moreover, it is recognized that various modifications of both the dispenser and perforating mechanism of the invention may occur to those skilled in the art. Therefore the scope of the invention is to be limited solely by the scope of the appended claims.

We claim:

1. In a dispenser for flexible sheet material including, a chassis adapted to be attached to a wall, means operatively connected to said chassis for rotatably supporting a roll of flexible sheet material, means operatively connected to said chassis for guiding a web of flexible sheet material from said roll to a position to be grasped by a user so that the user may pull the web out of the dispenser, and a mechanism operatively connected to said chassis for perforating said web at intervals therealong to divide the web into individual sheets, the improvement wherein said perforating mechanism comprises, a rotatably mounted roller, a rotatably mounted knife positioned adjacent said roller and having a radially outward portion defining a cutting edge for perforating the web as the web passes between the roller and the knife, said roller being operatively connected to said knife for synchronous rotation therewith and having a slot therein for receiving said radially outward knife portion as the knife rotates past the roller, and means associated with said knife for orienting said cutting edge substantially in the direction in which said radially outward knife portion moves with respect to the web during the entrance of said portion into said slot so that when the portion enters the slot, the cutting edge will effectively perforate the web, and wherein said dispenser further comprises a mechanism associated with said perforating mechanism for stopping the rotation of said knife and said roller and thus arresting the movement of the web after a predetermined length of the web has been withdrawn from the dispenser, and a variable timing means associated with said stop mechanism for controlling the period of time during which the stop mechanism is effective to stop the rotation of the knife and the roller.

2. In a dispenser for flexible sheet material including, a chassis adapted to be attached to a wall, means operatively connected to said chassis for rotatably supporting a roll of flexible sheet material, means operatively connected to said chassis for guiding a web of flexible sheet material from said roll to a position to be grasped by a user so that the user may pull the web out of the dispenser, and a mechanism operatively connected to said chassis for perforating said web at intervals therealong to divide the web into individual sheets; the improvement wherein said perforating mechanism comprises, a rotatably mounted roller, a rotatably mounted knife positoned adjacent said roller and having a radially outward portion defining a cutting edge for perforating the web as the web passes between the roller and the knife, said roller being operatively connected to said knife for synchronous rotation therewith and having a slot therein for receiving said radially outward knife portion as the knife rotates past the roller, and means associated with said knife for orienting said cutting edge substantially in the direction in which said radially outward knife portion moves with respect to the web during the entrance of said portion into said slot so that when the portion enters the slot, the cutting edge will effectively perforate the web; and wherein said dispenser further comprises a mechanism associated with said perforating mechanism for stopping the rotation of said knife and said roller and thus arresting the movement of the web after a predetermined length of the web has been withdrawn from the dispenser; and wherein said perforating mechanism further comprises a second rotatably mounted roller operatively connected to said first-mentioned roller for synchronous rotation therewith, said knife being mounted on said second roller; and wherein said stop mechanism comprises a camming pin operatively connected to said second roller for rotation therewith, a stop lever pivotally connected to said chassis and having a cam follower and a stop lug integrally affixed thereto, said cam follower being positioned in the rotational path of said camming pin, and said stop lug being movable into the rotational path of said camming pin upon the engagement of said pin with said follower for stopping the rotation of the pin and said second roller, and thereby stopping the rotation of said knife and said first roller, so that after said predetermined length of the web has been withdrawn from the dispenser a user may tear an individual sheet of the web from the portion thereof remaining within the dispenser along the perforations last-produced in the web by said cutting edge, and means connected to said stop lever for moving said stop lug out of the rotational path of said camming pin so that after said individual sheet has been torn from said remaining web portion an additional predetermined length of the web may be withdrawn from the dispenser.

3. A dispenser as recited in claim 2, further comprising a variable timing means connected to said stop lever for controlling the length of time of the stop lug remaining in the rotational path of the camming pin.

4. A dispenser as recited in claim 3, wherein said timing means comprises a pair of resilient vacuum cups, one of said cups being attached to said stop lever and the other of said cups being attached to said chassis, said cups being engageable in vacuum-gripping relationship when said stop lug is positioned in the rotational path of said caming pin, and valve means associated with one of said cups for regulating the flow of air between the cups when the cups are in vacuum-gripping relationship.

5. A dispenser as recited in claim 2, wherein the position of said camming pin is adjustable with respect to said second roller so that said knife and said first roller may be stopped while said last-produced perforations are either inside or outside the dispenser.

6. A dispenser as recited in claim 5, further comprising means operable when said knife and said fist roller are stopped with said last-produced perforations inside the dispenser for rotating the knife and the first roller automatically after said stop lug has moved out of the rotational path of said camming pin so that the leading edge of the web will be moved outside the dispenser to a position to be grasped by a user.

7. A dispenser as recited in claim 4, wherein said one cup is made of a relatively hard resilient material and said other cup is made of a relatively soft resilient material to thereby minimize the compression force required to engage the cups in vacuum-gripping relationship.

8. In a dispenser for flexible sheet material including a chassis adapted to be attached to a wall, means operatively connected to the chassis for rotatably supporting a roll of flexible sheet material, means operatively connected to the chassis for guiding a web of flexible sheet material from said roll to a position to be grasped by a user so that the user may pull the web out of the dispenser, a mechanism operatively connected to the chassis for perforating said web at intervals therealong to divide the web into individual sheets, said perforating mechanism including a rotatably mounted roller, a rotatably mounted knife positioned adjacent said roller and having a radially outward portion defining a cutting edge for perforating the web as the web passes between the roller and the knife, said roller being operatively connected to said knife for synchronous rotation therewith and having a slot therein for receiving said radially outward knife portion as the knife rotates past the roller, a stop mechanism associated with said perforating mechanism for stopping the rotation of said knife and said roller and thus arresting the movement of the web after a predetermined length of the web has been withdrawn from the dispenser, and a variable timing means associated with said stop mechanism for controlling the period of time during which stop mechanism is effective to stop the rotation of the knife and the roller; the improvement wherein said timing means comprises a pair of resilient vacuum cups, one of said cups being attached to said stop mechanism and the other of said cups being attached to said chassis, said cups being engageable in vacuum-gripping relationship when said stop mechanism stops the rotation of the knife and the roller, said one cup being made of a relatively hard resilient material and said other cup being made of relatively soft resilient material to thereby minimize the compression force required to engage the cups in said vacuum-gripping relationship, and valve means associated with said one cup for regulating the flow of air between the cups when the cups are in vacuum-gripping relationship.

9. A dispenser as recited in claim 8, wherein said stop mechanism is adjustable with respect to said perforating mechanism so that said knife and said roller may be stopped while the perforations last-produced in the web by cutting edge are either inside or outside the dispenser.

*10. In a dispenser for flexible sheet material including, a chassis adapted to be attached to a wall, means operatively connected to said chassis for rotatably supporting a roll of flexible sheet material, means operatively connected to said chassis for guiding a web of flexible sheet material from said roll to a position to be grasped by a user so that the user may pull the web out of the dispenser, a perforating mechanism operatively connected*

*to said chassis for perforating said web at intervals therealong to divide the web into individual sheets, said perforating mechanism including a rotatably mounted knife-receiving roller, a rotatably mounted knife positioned adjacent said knife-receiving roller and having a radially outward portion defining a cutting edge for perforating the web as the web passes between the knife-receiving roller and the knife, said knife-receiving roller being operatively connected to said knife for synchronous rotation therewith and having a slot therein for receiving said radially outward knife portion as the knife rotates past the roller, and a stop mechanism associated with said perforating mechanism for stopping the rotation of said knife and said roller and thus arresting the movement of the web after a predetermined length of the web has been withdrawn from the dispenser; the improvement wherein said guiding means comprises a rotatably mounted upper pinch roll positioned adjacent said knife-receiving roller and spaced from said knife in the direction opposite to the normal direction of movement of the web through the dispenser, a rotatably mounted lower pinch roll positioned adjacent said knife-receiving roller and spaced from said knife in the direction of the normal direction of movement of the web through the dispenser, said lower pinch roll also being movable toward and away from said knife-receiving roller, and biasing means for urging said lower pinch roll toward said knife-receiving roller, whereby the lower pinch roll moves away from said knife-receiving roller against the urging of the biasing means when a user initially pulls on the web so that the web is pulled tautly against the knife-receiving roller, and the upper and lower pinch rolls cooperate with the knife-receiving roller when the knife and knife-receiving roller are rotated to insure that the web is held tautly about the knife-receiving roller.*

*11. A dispenser as recited in claim 10 wherein said upper pinch roll also is movable toward and away from said knife-receiving roller and wherein the dispenser further comprises an additional biasing means for urging said upper pinch roll toward said knife-receiving roller.*

* * * * *